United States Patent
Goedelmann et al.

(10) Patent No.: US 6,256,851 B1
(45) Date of Patent: Jul. 10, 2001

(54) ARRANGEMENT FOR SHAPING A HELICAL TUBE

(75) Inventors: Gerd Goedelmann, Weingarten; Hans-Michael Winter; Bernhard Staudenmayer, both of Dudenhofen; Lothar Keller, Stuttgart, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/284,748

(22) PCT Filed: Oct. 17, 1997

(86) PCT No.: PCT/EP97/05745
§ 371 Date: May 26, 1999
§ 102(e) Date: May 26, 1999

(87) PCT Pub. No.: WO98/17412
PCT Pub. Date: Apr. 30, 1998

(30) Foreign Application Priority Data

Oct. 21, 1996 (DE) ............................................. 196 43 500

(51) Int. Cl.[7] .............................. B23P 23/04; B21C 37/12
(52) U.S. Cl. ................................................. 29/33 D; 72/49
(58) Field of Search .................................. 29/33 D, 33 T, 29/33 R; 356/383; 83/361, 672, 364; 72/49, 50

(56) References Cited

U.S. PATENT DOCUMENTS

| | | | |
|---|---|---|---|
| 3,630,126 | * 12/1971 | Ronai | 83/672 X |
| 4,058,996 | * 11/1977 | Schaeffer et al. | 72/49 |
| 4,198,165 | * 4/1980 | Kirschstein | 356/383 |
| 4,534,002 | * 8/1985 | Urban | 83/364 X |
| 4,706,481 | * 11/1987 | Castricum | 72/49 |
| 5,017,184 | * 5/1991 | Takahori et al. | 83/699 X |
| 5,477,717 | * 12/1995 | Skrebergene et al. | 72/49 |
| 6,112,132 | * 8/2000 | Grube | 83/361 X |

FOREIGN PATENT DOCUMENTS

3718886  * 12/1988  (DE) ..................................... 29/33 T

* cited by examiner

Primary Examiner—William Briggs
(74) Attorney, Agent, or Firm—Evenson, McKeown, Edwards & Lenahan, P.L.L.C.

(57) ABSTRACT

An apparatus for forming a helical tube (18), including a first stamping station for producing a flange on a metal strip (11), a forming tool (17) in which the flanged metal strip is formed to a helical configuration and adjacent side edges are crimped together to produce a tube, a cutting arrangement (19) which cuts the tube into predetermined lengths, and a mechanical-optoelectronic measuring arrangement (20) for determining the length of the helical tube (18) to be cut.

9 Claims, 3 Drawing Sheets

ARRANGEMENT FOR SHAPING A HELICAL TUBE

BACKGROUND AND SUMMARY OF THE INVENTION

The invention relates to an arrangement for forming a helical tube having a given length.

An arrangement is known from EP 0384625 in which in a first stamping station a flange is made on a metal strip. This metal strip is then bent into a spiral-shaped form inside a forming tool and the edges of the sides which make contact with each other are flanged together. A cutting arrangement subsequently cuts the helical tube off into predetermined lengths.

Such helical tubes are made of perforated metal sheet and are used, for instance, in filter technology to provide an inner or outer support pipe for a cylindrical filter element, for example a zig-zag shaped folded filter paper. Here it is important to note that the length of the helical tube has a very low permissible variation so that matching with the other elements and the arrangement of end plates can occur properly. It has been shown that, with the currently known arrangements, the length and the evenness of the helical tube vary greatly, on the one hand because during preparation its dimension can only be determined with difficulty and on the other hand because certain impurities from the added processing liquid caused inaccuracy.

SUMMARY OF THE INVENTION

The object of the invention is to provide an arrangement for shaping a helical tube which avoids the stated disadvantages and produces a helical tube of high precision.

The advantage of the invention is that for determining the length of the helical tube, a combination of a measuring arrangement is formed of mechanical and optoelectronic parts or of mechanical and electronic parts. It has actually been shown that optoelectronic determination, when used alone, is corrupted in its measurement result by processing liquid or metal shavings, and therefore the length of the helical tubes varies greatly. In a combination with a mechanical sensor or with a mechanical measuring arrangement, such errors are effectively eliminated since direct contact is established between the measuring arrangement and the helical tube.

It is provided in one embodiment of the invention that the measuring arrangement fastened to the machine table is to be equipped with a pivoting stop. This provides the advantage that when the helical tube is moved along further, the stop moves out of the way, however when touched, it immediately produces a corresponding signal.

Another embodiment of the invention provides a slowing of the transport speed of the metal strip or helical tube by means of a first measuring arrangement or a first measuring signal, so that the actuation of the cutting arrangement occurs at lower speeds and thereby higher precision of the arrangement results.

Another embodiment of the invention is to be seen in that the measuring arrangement is arranged on a carrying system so as to be longitudinally displaceable and an electromotive drive positions the measuring arrangement correspondingly to the helical tube length to be produced.

Advantageously, a hydraulic axial piston motor is used for transporting the metal strip and also for powering the whole arrangement which has a gear mechanism for rotational speed reduction. In addition, a brake is provided which makes possible an exact positioning of the cutting arrangement in conjunction with the position of the helical tube.

In order to give the helical tube a certain stability and guidance during cutting, the tool is extended further in the front area.

For easy exchange of the tools and pipes, the forming tool and dividing roller holder is divided lengthwise and can be folded open according to an advantageous embodiment.

These and other features of preferred embodiments of the invention are based not only on the claims but also on the specification and the drawings, where each of the individual characteristics can be realized either individually or together in the form of subcombinations in the embodiment of the invention and in other fields and can represent embodiments that are advantageous as well as patentable in themselves, for which protection is claimed here.

BRIEF DESCRIPTION OF THE DRAWINGS

The invention is explained in further detail hereinafter with reference to an illustrative embodiment.

Shown are.

DETAILED DESCRIPTION OF PREFERRED EMBODIMENTS

Figure 1:
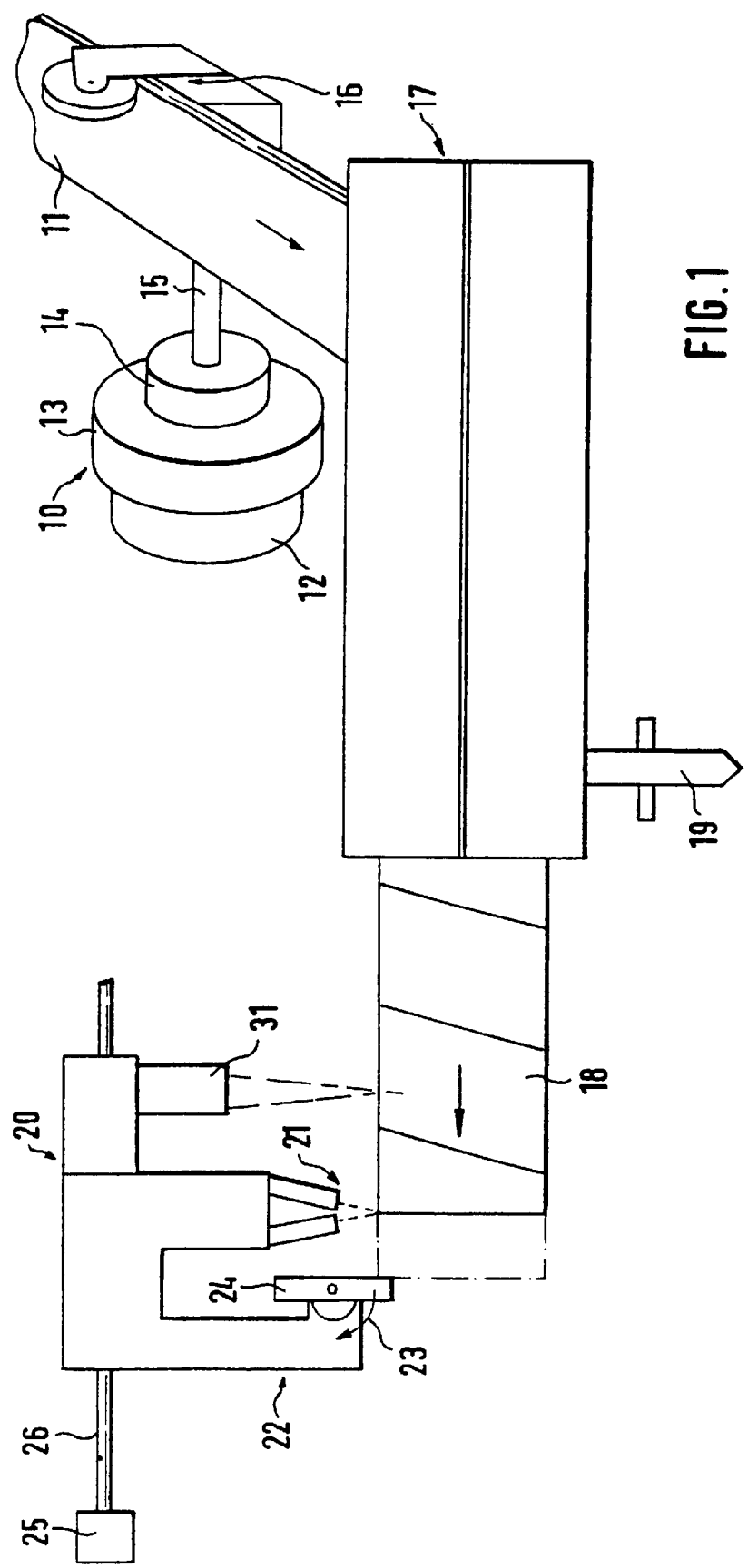
FIG. 1 a representation of an arrangement for shaping a helical tube

FIG. 1 shows the schematic representation of an arrangement for shaping a helical tube. A more detailed construction of this type of arrangement can be found in EP 0384625, for example. Further information is contained in EP 0206201 as well as EP 0714713.

The arrangement comprises a drive unit (10) for a metal strip (11). This metal strip is usually unwound from a coil and fed to the drive unit (10). The drive unit contains an axial piston motor (12), a gear mechanism (13), a brake (14), and a drive shaft (15). In a first step of the process, the metal strip (11) is pre-flanged on two sides with a flanging device (16). Then the metal strip is fed into a forming tool (17). In this forming tool, the metal strip is bent to tubular or spiral shape, and the edges of the sides are flanged together. The helical tube (18) produced in the forming tool (17) comes out on the left side and must subsequently be cut to a particular axial length. The impulse for the actuation of the cutting arrangement (19) is produced by the measuring arrangement (20). This measuring arrangement (20) comprises a first signaler (21) and a second signaler (22). As soon as the helical tube (18) reaches the area of the first signaler (21), the rotational speed of the axial motor is reduced through a corresponding signal.

An additional signaler (31) is disposed on the measuring arrangement (20); this one ensures that the measuring arrangement above the first signaler (21) is not set too low and possibly damaged by the helical tube (18).

When the helical tube (18) contacts the second signaler (22) in accordance with the illustration shown in broken lines, it swings out according to the arrow (23) due to the axial forward movement of the helical tube (18). A sensor registers this swinging movement and, when the pivotal displacement reaches a certain angle, produces a signal which activates the cutting arrangement (19). This accordingly cuts off the helical tube (18) at the predetermined length. Since the swinging lever (24) comes into mechanical contact with the helical tube (18), contaminants on the leading edge of the helical tube cannot skew the measuring result. In addition, the angular movement up to the triggering of the signal can be set very precisely so that a helical tube can be produced with a very precise length.

Provided that helical tubes with varying or different lengths are being made, the measuring arrangement (20) can be displaced lengthwise using an electromotive drive (25) and a spindle (26). This lengthwise movement can also be executed with high precision.

Figure 2:
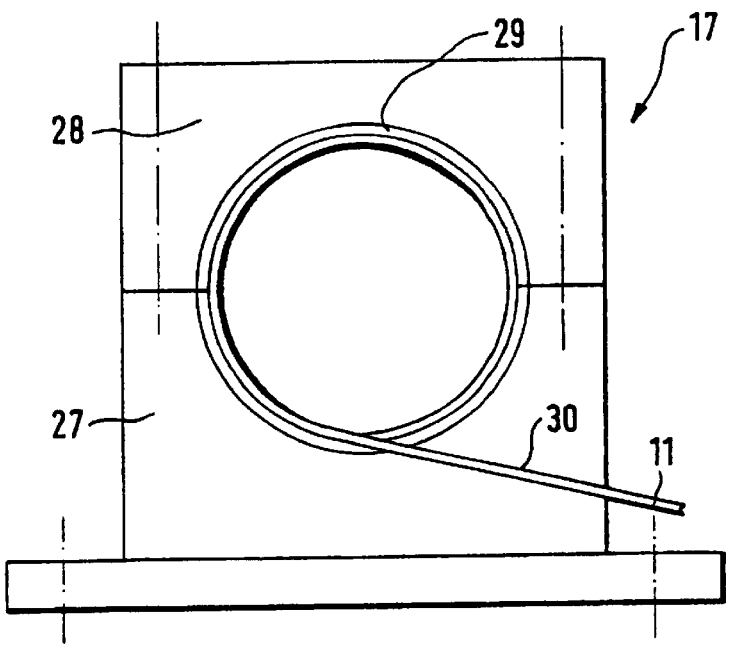
FIG. 2 a forming tool

FIG. 2 shows the forming tool (17) in the direction of its longitudinal axis; this forming tool (17) comprises a lower part (27) and an upper part (28) and therefore can be opened very easily. The forming chamber is coated with a material that has good sliding properties, for example sheet bronze (29). The sliding properties can be further improved by introducing appropriate processing liquid. The metal strip (11) is fed to the tool through a slit opening (30), rests against the inner wall and is accordingly flanged.

The possibility of opening the forming tool results in a substantially shorter set-up time.

The metal strip which is shaped to a helical tube in the arrangement is usually of perforated metal sheet. The disadvantage of perforated metal sheet is that a substantial amount of material is lost due to the perforation. If, on the other hand, a rib mesh is used for the metal strip, the material used will be utilized one hundred percent, no scraps remain. A helical tube made from rib mesh has the additional advantage that its helical tube only touches the filter element at certain points. Thus, the effective filter surfaces are only minimally lessened by the supporting body.

Figure 3:
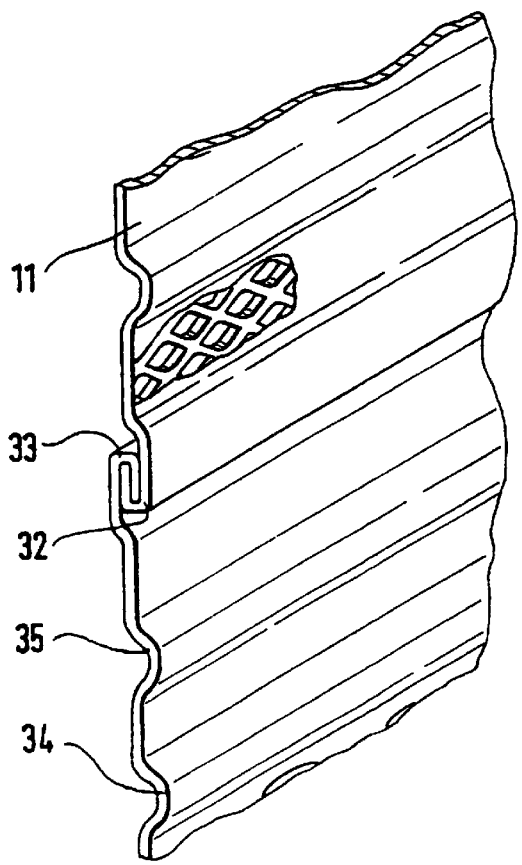
FIG. 3 a detail illustration of a supporting body of rib mesh

FIG. 3 shows a section of a helical tube made with rib mesh. It has an outer lock seam 32 and an inner lock seam 33 which effect the joinder of the helical tube. In addition, the rib mesh has ridges 34, 35, which are formed by stamping and stretching and on which the filter element, not shown here, is supported.

A further advantage of the rib mesh support body is that a lower flow resistance can be achieved with the same rigidity. In addition, the production costs are substantially lower for a rib mesh body compared with perforated sheet metal.

Figure 4:
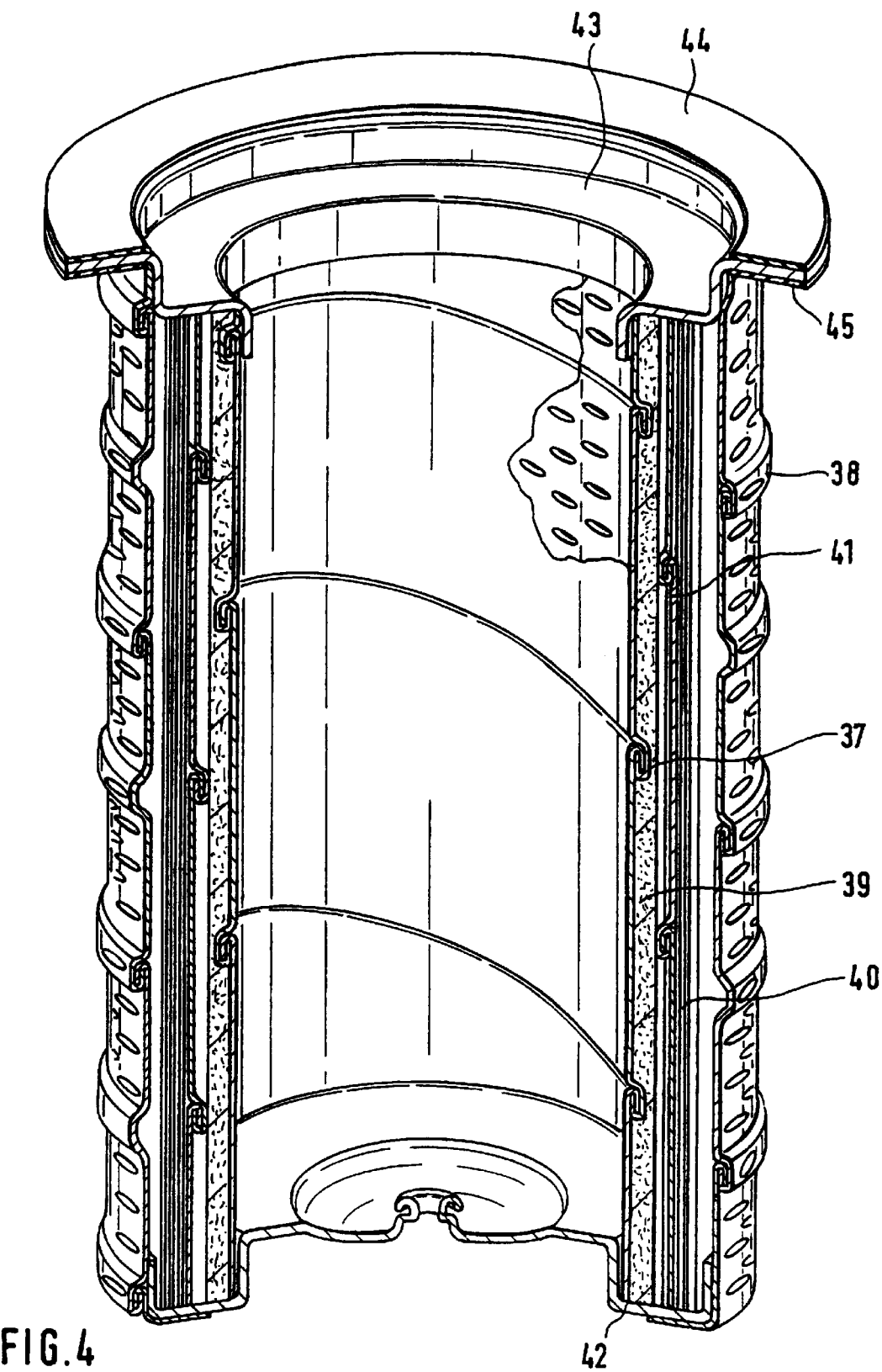
FIG. 4 a cross-sectional illustration of a filter element.

FIG. 4 shows the cross-sectional view of a filter element which is provided with a helical tube 37 formed of rib mesh. The helical tube 37 serves as an inner supporting body; another helical tube 38 can be provided in the outer region. Between these two helical tubes there is a first filter element 39 and a second filter element 40. The two filter elements are separated by a dividing element 41, which can also be a helically joined tube. End plates 42, 43 are located on the end faces of the filter element; the end plate 43 has an elastic seal 44, 45 and forms a compression fastening flange.

What is claimed is:

1. An apparatus for forming helical tubes having a given length, said apparatus comprising at least one first flanging station for producing a flange along at least one side edge of a metal strip, a forming tool which receives a flanged metal strip from the flanging station and bends the flanged metal strip into a helical configuration, a crimper which crimps together adjacent edges of the helical strip to form a spiral tube, and a cutter which cuts the formed spiral tube into lengths corresponding to said given length, said cutter comprising a measuring arrangement for determining the length of the spiral tube to be cut off, said measuring arrangement comprising a first measuring device which opto-electronically senses said spiral tube and a second measuring device which mechanically senses said spiral tube;

wherein said second measuring device comprises a pivotable stop which comes into contact with a leading end of said spiral tube and is pivoted through a given angle by forward movement of said spiral tube, said second measuring device emitting a control signal to activate said cutter when said pivotable stop is pivoted through said given angle.

2. An apparatus according to claim 1, wherein when said measuring arrangement detects that said spiral tube is moving in position to be cut, the measuring arrangement sequentially emits a first signal which slows forward movement of said spiral tube and a second signal which activates said cutter.

3. An apparatus according to claim 1, wherein said measuring arrangement is longitudinally displaceable on said apparatus by an electromotive drive such that the measuring arrangement can be adjusted in position to correspond to desired variations in the given tube length.

4. An apparatus according to claim 1, wherein said apparatus comprises a hydraulic axial piston motor for transporting the metal strip, said motor being provided with a gear mechanism for reducing the transport speed of the strip, and a brake for holding the spiral tube in a desired position.

5. An apparatus for forming helical tubes having a given length, said apparatus comprising a first flanging station for producing a flange along at least one side edge of a metal strip, a forming tool for receiving the flanged strip from said flanging station and forming said flanged strip into a helical configuration, a crimper which crimps together adjacent side edges of the helical strip to form a spiral tube, and a cutter which cuts the formed spiral tube into lengths corresponding to said given length, wherein said forming tool is extended forwardly beyond said cutter to stabilize and guide the spiral tube during cutting operations.

6. An apparatus according to claim 5, wherein said forming tool is split lengthwise so as to be openable.

7. An apparatus according to claim 5, wherein said forming tool is provided with a hardened gliding surface for the metal strip.

8. An apparatus according to claim 5, wherein the forming tool is coated with a coating which reduces friction between said forming tool and the metal strip.

9. An apparatus according to claim 5, further comprising a switch mounted on a measuring arrangement, said switch emitting an advance signal as said spiral tube approaches cutting position.

* * * * *